United States Patent
Tomaszewski et al.

(10) Patent No.: US 9,691,036 B2
(45) Date of Patent: Jun. 27, 2017

(54) DECISION MAKING IN AN ELASTIC INTERFACE ENVIRONMENT

(71) Applicant: CA, Inc., New York, NY (US)

(72) Inventors: John Michael Tomaszewski, Villa Park, IL (US); Joshua Hunter Helmbrecht, Manchester, CT (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/670,144

(22) Filed: Mar. 26, 2015

(65) Prior Publication Data

US 2016/0283870 A1 Sep. 29, 2016

(51) Int. Cl.
*G06F 7/00* (2006.01)
*G06Q 10/02* (2012.01)

(52) U.S. Cl.
CPC .................. *G06Q 10/025* (2013.01)

(58) Field of Classification Search
CPC ........ G06Q 10/025; G09B 5/06; G09B 5/125; G09B 29/00
USPC ............................................ 235/376; 705/6
See application file for complete search history.

(56) References Cited

U.S. PATENT DOCUMENTS

| 7,415,675 B2 | 8/2008 | Habon et al. |
| 2005/0192025 A1* | 9/2005 | Kaplan ............... G06F 17/3087 455/456.1 |
| 2006/0168300 A1* | 7/2006 | An .......................... G09B 5/06 709/231 |
| 2006/0188230 A1* | 8/2006 | An .................... G06F 17/30241 386/227 |
| 2007/0166672 A1 | 7/2007 | Morita et al. |
| 2012/0102409 A1* | 4/2012 | Fan ......................... H04W 4/00 715/738 |
| 2014/0325398 A1* | 10/2014 | van de Bruggen ... G06F 3/0484 715/760 |

* cited by examiner

*Primary Examiner* — Laura Gudorf
(74) *Attorney, Agent, or Firm* — Baker Botts L.L.P.

(57) ABSTRACT

A method for a dynamic adapter design pattern is described. The method comprises a series of tour components being selected for a user from a plurality of tour components. This selection may be based on interaction information of a plurality of past participants with the plurality of tour components. A selected tour component, from the plurality of tour components, is received from the user. The series of tour components are adapted in real-time based on the selected component. This adaptation occurs by determining the user's prior interaction with the plurality of tour components, comparing the user's prior interaction and the selected tour component with the interaction information of the plurality of past participants, and modifying the series of tour components based on the comparison.

18 Claims, 3 Drawing Sheets

DECISION MAKING IN AN ELASTIC INTERFACE ENVIRONMENT

BACKGROUND

The present disclosure relates to elastic interfaces and, in particular, to an apparatus, computer-readable medium, and method for adapting an interface environment.

SUMMARY

According to an embodiment of the present disclosure, a method comprising selecting a series of tour components for a user from a plurality of tour components based on interaction information of a plurality of past participants with the plurality of tour components. The method further comprising receiving, from the user, a selected tour component from the plurality of tour components. The method further comprising adapting the series of tour components in real-time based on the selected component, by determining the user's prior interaction with the plurality of tour components, comparing the user's prior interaction and the selected tour component with the interaction information of the plurality of past participants, and modifying the series of tour components based on the comparison.

According to another embodiment of the present disclosure, a computer configured to access a storage device, the computer comprising a processor, and a non-transitory, computer-readable storage medium storing computer-readable instructions that when executed by the processor cause the computer to perform the aforementioned method.

According to another embodiment of the present disclosure, a computer program product comprising a computer-readable storage medium having computer-readable program code embodied therewith, the computer-readable program comprising computer-readable program code configured to perform the aforementioned method.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-4, like numerals being used for corresponding parts in the various drawings.

DETAILED DESCRIPTION

Figure 1:
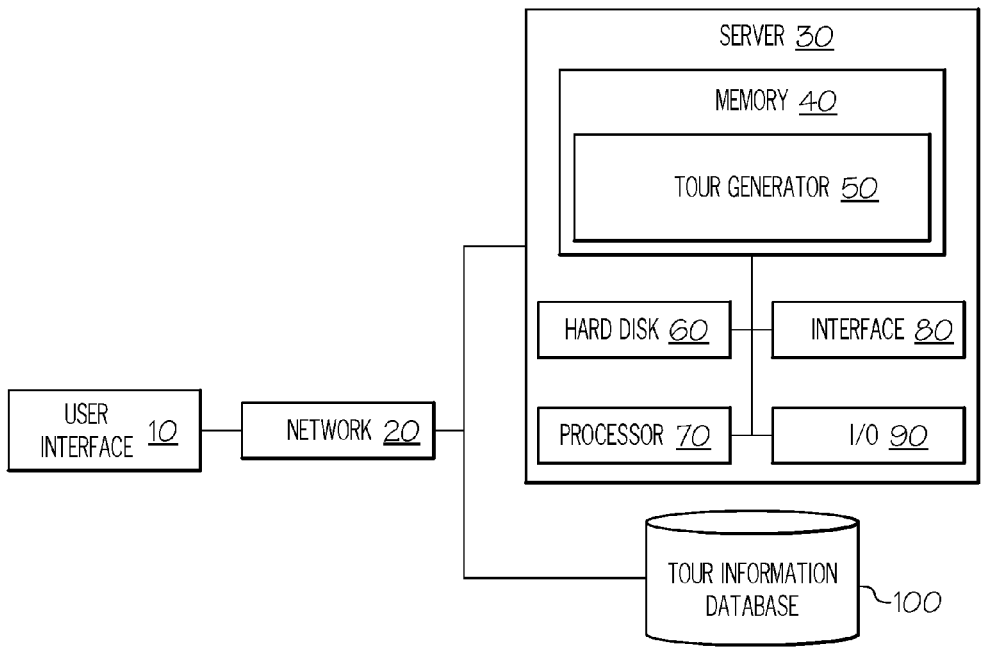
FIG. 1 is a schematic representation of the tour generation ecosystem in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, JavaScript or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to interactive interfaces, systems and methods disclosed herein may also be related to any non-software, such as, for example, museum tours or any other tour contexts.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Systems that use interactive tours that assist users participate with the system present predefined tours that are static for all users. Tours are more helpful when the content may be adjusted to meet the user's expertise. Tour systems should provide content in areas the user has not experienced while omitting content previously mastered. In addition, these systems currently do not support adaptive on-the-fly tour creation based on the user's previous interactions and history.

In addition, existing systems that support interactive tour processing fall short in the ability to handle dynamic user interfaces (UI) that are not statically defined. Often, systems require all UI components to be defined up-front and fail to adjust to the user's interactions. Further, these existing systems cannot handle content that is not pre-determined prior to initiating the interactive tour.

The present disclosure provides a system and method for addressing these concerns and improving the overall interactive tour experience to the end user. The present disclosure overcomes several deficiencies of other tour systems. Other systems do not have the ability to dynamically build tour content based on the user's history, behavior rules, categories and user operations. User operations may include failed, partially completed, and/or successful operations. Moreover, other systems are static and unable to modify step sequence and content after initial startup of a tour. In other words, construct is in stone once a tour starts. The present disclosure provides an adaptive tour interface that builds tour content based on the user's history in addition to the interaction history of the general population of users. The present disclosure provides the ability to perform on-the-fly updates of the target elements in each step, in real time, to adjust and adapt to the underlying user interface changes performed by the user. Additionally, the present disclosure provides a system for detecting the state and availability of target elements and dynamically updates tours to reflect and manage the availability of the tour content in real time.

Previous systems do not provide an adaptive event time-driven processing to handle non-static user interfaces. Furthermore, previous systems cannot readily handle situations where the user interface is not fully rendered prior to showing tour step callouts (independent popup informational panel). The present disclosure provides a mechanism for UI state detection and checks for availability of UI components, determines whether they have been rendered or not, and adjusts corresponding controls to handle tour processing.

Other systems lack the ability to provide a construct for taking logical branches in the tour and allow users to interact with the UI while maintaining the state of the tour. The present disclosure provides a construct for making logical branches in the tour based on users' context and allows users to interact with the UI and will maintain the appropriate context in the tour at all times.

Previous systems lack automatic controls for the display of tour steps or callouts. Previous systems further lack controls for detection of an invalid tour execution state and abandon the user in an invalid condition unable to complete the tour. The present disclosure is able to automatically optimize the display of step callouts based on the current state of the UI. In addition, the present disclosure provides a construct for navigating to the target element in the UI. Finally, the present disclosure provides the ability to detect invalid tour execution conditions and automatically notify the user of this condition. In addition, the tour system automatically enables a debugging mechanism when an invalid condition is met and is used by the subject matter expert. The present disclosure provides an extensive system for diagnosing errors and problems in the system. This can be used by subject matter experts to detect how the tours are being automatically being generated. This system also includes various simulation modes to assist with creating and using a tour system.

The present disclosure highlights the web browser environment but is not exclusive to it. Note that this system may also work with any user interface such as a web based mobile application, an interactive tour at an exhibit (such as a museum, zoo, stadium, etc.), or a thick client application. The tour system may be applied in any setting involving training or the distribution of information. Metadata regarding a museum tour system may include general information about the exhibits, such as location and description, as input into other modules in the tour system. In a software context, the tour system may utilize interaction information and generate other tours based on rules and criteria entered by a subject matter expert or automatically via the system.

Accordingly, there is a need in the marketplace for a dynamic interactive tour presentation that improves client experience. From an efficiency and cost standpoint, the current disclosure provides an effective solution by dynamically adapting tours according to user interaction and preference. Embodiments of the present disclosure may address the above problems, and other problems, individually and collectively.

FIG. 1 is a schematic representation of the tour generation ecosystem in accordance with a non-limiting embodiment of the present disclosure. The tour generation ecosystem may include a user interface (UI) 10, a network 20, a server 30, and a tour information database 100. The tour information database 100 may store information and data regarding tour interactions, tour projections, and tour components.

The server 30 may include a memory 40 with a tour generator 50. The tour generation process may take place on a tour generator 50 on the server 30. The server 30 may also include a processor 70, an interface 80, input and output ("I/O") device 90, and a hard disk 60. Processor 70 may be operable to load instructions from hard disk 60 into memory 40 and execute those instructions. Memory 40 may store computer-readable instructions that may instruct the server 30 to perform certain processes. I/O device 90 may receive data from a server or network.

The server 30 or network 20 may comprise one or more entities, which may be public, private, or community based. The network 20 may permit the exchange of information and services among users/entities that are connected to such network 20. In certain configurations, the network 20 may be a local area network, such as an intranet. Further, the network 20 may be a closed, private network/cloud in certain configurations, and an open network/cloud in other configurations. The network 20 may facilitate wired or wireless communications of information and provisioning of services among users that are connected to the network 20.

Figure 2:
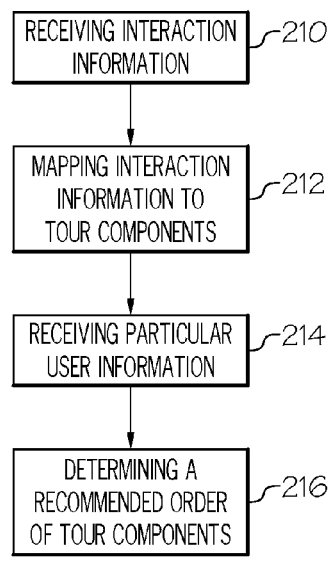
FIG. 2 is flow chart depicting the tour generation process in accordance with a non-limiting embodiment of the present disclosure.

FIG. 2 is flow chart depicting the tour generation process in accordance with a non-limiting embodiment of the present disclosure. In step 210, the tour generator 50 receives interaction information. The interaction information may be from past participants or a current user in the tour. In addition to interaction information, the tour generator 50 may consider a variety of other factors such as user age, user preferences, previous interactions with the tour system, or any other data regarding user qualities or interactions. In step 212, the interaction information is mapped to the tour components. The tour generator 50 may map interactions to specific components. The mapping process may be conducted in a partial manner, depending on the relevance of each interaction.

In step 214, the subject matter expert defines tour content and behavior rules later used by the tour generator 50 when defining tour content. In developing tour content and interrupting the rules, the tour generator 50 considers, inter alia, the received interaction information and the tour components mapped to the interactions.

In step 216, the tour generator 50 determines a recommended order of tour components based on, inter alia, the subject matter expert's behavior rules and the available components. The subject matter behavior rules may depict a recommended order of tour components based on any data in the tour system. The subject matter behavior rules may also be evaluated and modified as additional interaction information, user qualities, and user history become available. In other words, the rules are adaptable to the user population. Furthermore, the recommended tour components or tour path may be stored in database 322 and subsequently evaluated and modified based on additional subsequent interaction information, metadata, user quality, user information, or general population history.

Furthermore, the tour generator 50 may select a series of tour components for a user based on a multitude of data. This data may include previous interaction information of the user or a general population of users, user preference and expertise, probability statistics based on interaction information, and any other relevant data. The user may continue through the series of tour components as selected. However, if the user veers from the selected series of tour components, the tour generator 50 may adapt the tour to the user's decisions. For example, the user may choose to interact with the tour components in a different order than selected. In another example, the user may choose to interact with a tour component distinct from the selected series.

The tour generator 50 may adjust to the user's decisions and interactions by considering any relevant data mentioned in the present disclosure. For example, the tour generator may determine the user's prior interaction with the tour components, and compare the user's prior interaction and the selected series of tour components with interaction information of the general population of users. The tour generator 50 may slightly adjust the selected series of tour components by adding additional components or changing the order of the components. Furthermore, the tour generator 50 may develop a new series of tour components based on the user's interaction and the given data.

Figure 3:
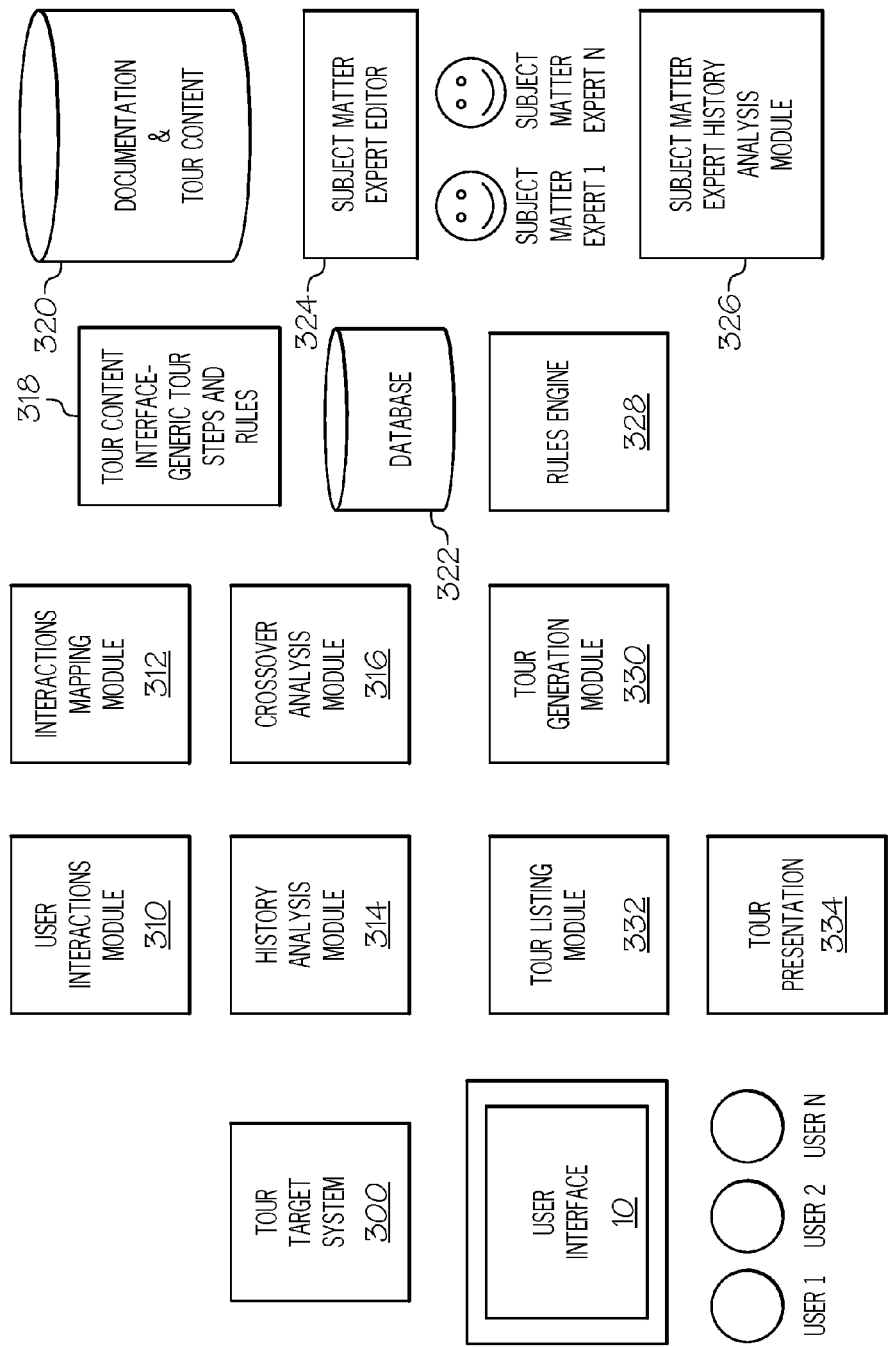
FIG. 3 illustrates a tour generation infrastructure in accordance with a non-limiting embodiment of the present disclosure.

FIG. 3 illustrates a tour generation infrastructure in accordance with a non-limiting embodiment of the present disclosure. This tour infrastructure accounts for previous interaction and navigation of the tour by past participants and dynamically builds or updates tours. Tour updates may also be based on the activity of the current user. The tour system also determines the best tour components for future tours based on interaction information and user history. Tour steps may be added or removed based on rules indicating if the user accesses a certain portion or component of the tour target system 300 frequently. The tour system may also build candidate tour topics based on portions of the tour target system 300 visited by the user.

The tour system may also adapt to and match the user's skill level, or be updated based on behavior rules and history of the user. The tour system uses rules based on the user interaction (i.e., dismiss, success, failure, etc.) and navigation history to determine tour content. In addition, the tour system ranks, creates, or removes tours based on user history, geo-location, and behavior rules defined by automation or subject matter experts. The rankings incorporate criteria from interaction history across the general population of users. The tour system history 314 and user interaction recording engine 310 and 312 may also provide information to the subject matter experts in module 326 when defining new tours as well as identifying areas of the tour in which users need additional help.

The tour system may be integrated with an external documentation system where technical writers can provide tour steps alongside the detail documentation for the product. The tour system may use behavior rules and a point system that associates user operations to tour steps and corresponding tour steps and tour text. These behavior rules may be evaluated when the user interacts with the product and the tour system subsequently updates the existing tours or generates new tours.

Participant interaction with the tour system is imperative to tour content generation. As users interact with the tour system, navigation behaviors that may affect tour content in the tour system include successful operations in tour content, failure operations or errors, entering a process and backing out or quitting, and partially completing tasks. Partial success may be indicative of a complex step that deterred the participant from completion.

Additionally, the tour system may provide a framework for defining generic tour steps that may be context independent. End-to-end tours may be created by combining several generic tour steps. The tour system permits generic tour topics to be built by subject matter experts in parallel with the general documentation. A subject matter expert can associate a topic with one or more of the tour components and provide behavior rules that indicate when a topic is to be added or removed from a tour.

Behavior rules may be defined for tour topics, generic or otherwise, that dictate how a topic correlates with one or more tour components. Behavior rules may also determine conditions in which the tour topic should be displayed, added, or removed in a tour. Furthermore, behavior rules may determine conditions in which a topic should be hidden or removed depending on user mastery, category of target elements being visited, or history in certain operations or topics.

A mapping mechanism may be provided by the tour system to define areas of the product and the corresponding components. A subject matter expert may use the mapping mechanism to correlate components and operations when writing behavior rules that manipulate the generic tour topics. The tour system may later use this information to dynamically build or update one or more tours based on a user's past history. In tour systems the operations performed by a subject matter expert may also be automated.

The tour system may provide a baseline tour that acts as a foundation that is always present. Other tour components may be built upon this foundation depending on aforementioned rules. The tour system may also provide the ability to reset user history so a user can revisit tour steps or components previously experienced or mastered. The tour system may further provide the ability to collect user history about multiple users and build or update tours based on the collective history information.

FIG. 3 depicts several tour modules in the tour system. The tour target system 300 may be the environment where the tour is running. This environment may include software interface or some other non-software system such as a proprietary system. The tour target system 300 may be a software application and may be applied to any kind of tour system.

The user interactions module 310 provides the interface between the external target system and other modules. The user interactions module 310 may take input and operations performed by the user and transform them into objective operations that can be used throughout the tour system. This module defines the objects that can be interacted with including the operations that can be performed on a particular element in the target system. For example, in a software application this may be a dialog box with user options (i.e., name, title, phone number, time zone, etc.) and actions that can be performed (i.e., input values, time zone selection, save, cancel, error handling, etc.).

The user interactions module 310 may provide a unique identifier for target system components. The identifier may also include additional characteristics, such as, for example, a global positioning system or identifying attributes in the target system to locate the target system component. Several types of operations may be performed on the target system component. One such operation may include an open/view/visit panel, wherein the user opened a dialog panel or visited a particular exhibit or portion of an exhibit. Other operations may include an input value, select value, accept or save value, cancel value, and validation value. The input value operation allows entering text for an attribute. The select value operation permits selecting from a predefined list of options. The accept or save values permit storing selections or values. The cancel value permits omission of any edits. Finally, the validation value permits verification that values are correct or specific restrictions are necessary.

The interactions mapping module 312 receives object operations from the user interactions module 310 and maps them to target system components (i.e., portion of the user interface, an exhibit in a museum, a section inside of an exhibit, etc.) with which the user interacted. The interactions mapping module 312 also provides object components that may be used when defining rules for tour generation.

The tour system provides a set of generic interfaces that may respond to user interactions on objects in the tour target system 300. The interfaces provide generic handling expected for all components capable of being monitored. Various user interaction operations include: on visit component, on exit component, sequence completion, on partial completion, and on completion. The sequence completion operation may indicate success or failure with the component and the last set completed. The on partial completion operation may include wherein the user started the sequence but stopped prior to completion. The on completion operation may include success or failure on the component, or a series of steps or multiple sequence completion. For example, a successful completion may be defined as a series of user interactions from the user interactions module 310 such as an input value followed by accept and correct validation of the input value.

Each target system component may define a category to use in conjunction with rules that may limit particular tour steps to specific categories. A category identifier may identify one or more categories a target system component is associated with. For example, the category identify may indicate an area in a software product or exhibit. For a software product, the area may include, for example, user identification forms related to user name, address, tax information, Social Security Number, school, work location, etc. For an exhibit, the area may include, for example, museum exhibits such as birds, tropical birds, land based birds, etc.

The history analysis module 314 takes the results of the user interactions and breaks them down into a summary. The tour generation module 330 may later use this summary in conjunction with the rules engine 328. The summary is used when generating the final tour content for the users in the system. The history analysis module 314 may generate a historical summary focusing on only meaningful information identified by the tour content interface 318. The history analysis module 314 may also filter out interactions not applicable based on tour rules.

The historical summary information is regenerated each time a user interacts with the tour system. The history analysis module may also refine, update, or remove information based on tour rules in real-time from the historical summary. Furthermore, the historical analysis module may identify user patterns in the target system and use these patterns when creating, updating, optimizing, or removing unnecessary tour content.

The history information generated by the history analysis module 314 may also be used by the subject matter expert history analysis module 326 to provide subject matter experts with the general health of the tour system. The history information aids the subject matter experts to define and refine tour content and corresponding rules.

The crossover analysis module 316 takes information from the general population of users in the tour system and summarizes behaviors. The crossover analysis module 316 may analyze each user in the tour system using results of the interactions mapping module 312. Furthermore, the crossover analysis module 316 may aggregate and identify general trends and behaviors that occur in the target system components. The tour generation module 330 also uses this analysis when identifying optimal tour content for the general population.

As part of the aggregation and identification process, the crossover analysis module 316 determines which particular behaviors to consider. For example, the crossover analysis module 316 may consider the following default behaviors such as, for example, successful operations, frequently visited, low use, failure operations, back-out conditions, and partial success. Considering successful operations may include mastery or completion of a component. Frequently visited behavior may include a form often viewed or an exhibit with high visitation. Low use behavior may include wherein a form is not viewed often or an exhibit with low visitation. Failure operations may include error prone behavior, a form wherein users often encounter errors, or an exhibit where users cannot complete steps. Back-out conditions may include abandoned or cancelled forms, or an exhibit viewed incompletely. Partial success may include tasks initialized that fall short of completion.

Each behavior will have a threshold that indicates when a particular target system element is deemed to have the behavior 'enabled.' For example, the frequently visited behavior may be considered 'enabled' when a threshold of 90% of users visiting the exhibit or component is surpassed. In other words, if 90% of users visit the exhibit or component, the exhibit or component is considered 'frequently visited.' A subject matter expert may examine such a characteristic to develop tour content that best suits the general user population. In another example, if 50% of users encounter an error, such as entering invalid input into a form field, the input form behavior may be considered 'error prone.' Additionally, this characteristic may be considered when generating tour content for users that may need additional assistance when entering particular forms.

Additional module characteristics can be added by defining the user interaction to observe a threshold at which the characteristic is valid for the target element. For example, a new behavior such as 'popular' could be entered into the system. This behavior may identify a form or exhibit that is greatly enjoyed by the general population with a threshold of 90% of users repeat viewing. This behavior may be leveraged by the system to provide increasingly in-depth tour content once this threshold is achieved by the users of the system.

The tour content interface module 318 contains the fundamental structure used to define tour content and rules associated with the content. The tour content interface module 318 defines first time tours and content when a system lacks prior history and user interactions. Once users begin to interact with the tour target system 300, the tour content interface module 318 will refine, add, update, and/or remove tour content based on user behavior and rules defined by the subject matter expert(s).

The tour content interface module 318 defines available tours and presents them to the user in the tour listing module 332. These lists may be unique based on the user's history. Furthermore, the tour list may be modified based on the behavior of the general population of users. The tour content interface module 318 may also contain a high level summary of the tour content and rules for showing or hiding tour steps. The tour content interface module 318 contains tour steps, which may have atomic information on a particular feature or element in the tour target system 300. This information is displayed at a particular step in the tour. Tour step attributes may define what is displayed as well as where in the information is displayed. A tour step may be self-contained, that is, it may not access an external system but may contain information for a very specific callout in the context of series of steps. The step or callout may not be tied to a particular target element but may provide information in the context of the tour.

Tour step attributes include a description, a sequence, a target system component, an optional category identifier, an external documentation system reference, and behavior rules for adding and removing to one or more tour steps. For the description, text may be displayed in the tour step. Text may also be combined with the external document system for specified content. For the tour step, either the description or external document system must be specified. For the sequence, the relative order of the step is shown in a tour sequence. The target system component defines the associated element in the target system associated with the tour step and behavior rules. In addition, the target system component defines where the tour step is displayed in the target system. The optional category identifier defines one or more categories with which the tour may be associated. The category identifier may be used in conjunction with rules that may limit particular tour steps to specific categories. The external documentation system may be a URL reference to an external Content Management System (CMS) or other media containing video, audio, RSS feed, etc. If a rule such as 'always show' is specified, the tour step is always shown in the associated tour.

There are several types of rules for tour listings, tour content, and tour steps, and each can be used to optimize the user experience.

Tour listing rules define when a tour is shown or hidden from a high level list of available tours for a user. An always show rule indicates the tour will always be listed for all users regardless of conflicting inputs. This rule takes precedence over other user behaviors. Behavior rules indicate if a tour should be listed based on successful behaviors that have been recorded by the crossover analysis module 316. A tour may indicate that it should be listed if one or more behaviors have been enabled. Likewise, a tour may indicate that it should be removed if one or more behaviors have been enabled.

Tour content rules define the content of individual tours. These rules define what type of tour steps can be used to build a tour. Category rules indicate the categories of tour steps that may be combined together to build a particular tour. Subject matter experts may define one or more categories for a particular tour that may be subsequently used with the historical behavior rules to generate tour content. Behavior rules indicate if a tour is generated based on historical behaviors. A tour may indicate that it should be generated if one or more behaviors have been enabled.

For example, a tour may be generated based on the failure operations behavior by one or more users, such as a user failing to complete a form due to lack of information about the required prerequisites. The tour system may detect the threshold being exceeded for the failure operations behavior and add a new tour to the system. The tour system may add new tour steps to the tour associated with the target system element that is failing, the form in this example. The tour system also takes into consideration the category associated with the tour steps to ensure that the content is focused on the related area. Finally, the tour system may make a list of available tours for only the users that had failures for the target system element.

Tour step rules define the content of tour steps. An always show rule indicates the tour step will always be listed when shown, as previously mentioned. Furthermore, this rule is used with the tour step is required for a given tour. The always show rule could indicate an important note, critical information, a disclaimer, or other important information that must be presented in a tour. Step category rules are used to further refine when a particular step can be used in a tour. It contains an optional inclusion or exclusion rule. Step category inclusion rules provide conditions that indicate what other categories this tour step may apply that are not in the category identifier for the tour step content. This is useful when the tour step should also be included in special conditions or other contexts. For example, if an Antarctica wild life exhibit should include a tour step for land based birds, an inclusion rule may specify to include this tour step within the exhibit.

In contrast, step category exclusion rules provide a list of other categories to which a tour step should not apply. These rules are similar to inclusion rules but instead denote conditions when the rule should not be included when generating a tour. Finally, step behavior rules indicate if a tour step is generated based on the historical behaviors. A tour step may be applicable and may be added to a tour if one or more behaviors have been enabled.

The documentation and tour content module 320 is a repository containing the tour content associated with the product tours. The tour system allows generic tour topics to be built by subject matter experts for each of the tour components in parallel with the general documentation. The tour system could be an external documentation system such as a CMS or URL reference to an external link or other media containing video, audio, RSS feed, etc.

The documentation and tour content module 320 is responsible for normalizing the tour content such that it is usable in the context of the target system. This may require the data to be parsed and reformatted to work with the user interface 10 shown in the target system. For example, a video player in a software product or a video monitor at an exhibit may need to be parsed and reformatted to be compatible in the target system.

The subject matter expert editor module 324 is suitable for entering, modifying and defining rules for tour content. This module also presents tour content that was automatically generated based on the rules and behaviors exhibited by the user population. In addition, subject matter experts may manually enter tour content into the system using the editor.

The subject matter expert editor module 324 provides an editor that works with the tour content interface module 318, the interactions mapping module 312, the documentation and tour content module 320, and the subject matter expert history analysis module 326 to define the fundamental tour steps, rules, and predefined high-level tours. This is the primary interface where all tour content is updated in the system by the subject matter experts. In the subject matter expert editor module 324, the subject matter expert can review content and usage patterns, as well as identify new content using the subject matter expert history analysis module 326. Subject matter experts may use statistics from the subject matter expert history analysis module 326 to further refine and optimize the tour content and rules to best suit the user population.

The subject matter expert editor module 324 is used primarily for defining default tours and out-of-the-box tour content, defining high level tour listings, defining tour content by updating or modifying existing tour content that was automatically updated, defining individual tour steps by creating, updating, or modifying existing tour steps, and listing all available tours. This module is used by the subject matter expert to view all tour listings presented to the users. These listings may be further refined based on specific users or behaviors performed by users. The list of current tours displays tours that were generated automatically based on the rules and current user population. The list also displays tours manually created by the subject matter experts.

The subject matter expert history analysis module 326 provides a summary and statistics on the overall target system and shows the general health of the system. This module provides information to the subject matter experts to better assist them in building core tour content that best suits the users of the system. The subject matter expert history analysis module 326 uses the history analysis module 314 to get real-time information about the target system and behaviors for individuals as well as the general population.

The subject matter expert history analysis module 326 identifies parts of the target system that need further details or more explanation, refinement and additional focus. This module also identifies parts of the tour system that have been mastered by the users of the system and require less attention. Furthermore, this module also identifies rules that may need refinement to better target the user audience. Finally, this module identifies tour content that may be unused due to unexpected user behavior or invalid rules. These rules may be evaluated and modified as additional interaction information becomes available.

The database 322 is a repository for the raw data from many parts of the system such as tour content, user history, interaction mappings between target system and tour content, rules and all necessary data needed to build and update the tours. In general, data is gathered as users interact with the target system. This data is recorded by the user interactions module 310, refined, and filtered using the history analysis module 316. The results are stored in the database 322. Likewise, the tour content generated by the subject matter expert and dynamically generated tour content are stored in the database 322. The working data used by the other components in the system is also stored in the database 322.

The rules engine module 328 is responsible for evaluating the rules defined by the subject matter expert and applying the associated conditions to the outcomes of the operations performed by the users. The rules engine module 328 receives as input the subject matter rules, user interactions and behaviors, categories, mappings and history information. Next, it evaluates and analyzes this information and later transmits this analysis to the tour generation module 330. The rules engine module 328 evaluates the rules defined in the tour content as well as analyzes the behaviors exhibited by the user population.

The tour generation module 330 is responsible for building tour content based on the output of the many modules in the tour system. This module is responsible for generating, updating, and removing tour content by applying the user's history, rules, general population behaviors, categories, and available default tours in the system. The tour generation module 330 will take all the criteria about the user to build the optimal tour content that makes the best sense for that user. This criteria includes, inter alia, areas visited, successfully mastered, trouble areas, areas backed-out, areas not visited, as well as any custom behaviors that may be defined. The criteria will include all information from the crossover analysis module 316 about how the general population is using the product and general population behaviors. The tour generation module 330 will dynamically update existing tours based on the rules and behaviors of the user and general population possibly adding new steps or eliminating steps from tours.

The tour generation module 330 will dynamically create new tours based on the rules and user behaviors. For example, a new tour may be created due to the user having issues in a particular area of the target system. The rules and tour content defined by the subject matter expert associated with failure operations behavior problem areas may be dynamically added to the new tour. Thus, the end result is a tour that will guide the user through the problem areas and allow the user to be successful in their tasks. If multiple users are having the same problem, the crossover analysis module 316 may also make available this tour to the users having the same problem. The tour generation module 330 may update the tour content in the system using an asynchronous algorithm that fires after modifications occur as result from user interactions.

User interactions include when the user navigates to a system component under tour control. In other words, when the user enters or exits areas without user interaction. User interactions further include interactions with a system component, performing an operation or sequence of operations, performing a back-out operation, partial operations, etc. The tour system will queue up updates processing the events as they occurred in sequence.

The tour generation module 330 may receive input from the interactions mapping module 312, the history analysis module 314, the crossover analysis module 316, the tour content interface module 318, the rules engine module 328, and the documentation and tour content module 320. The tour generation module 330 may respond to target system updates and may modify the affected tours when a component is added, modified, or removed. Likewise, if the subject matter expert adds, modifies, or removes tour content, the tour generation module will update all effected tours.

The tour listing module 332 is responsible for displaying the list of applicable tours based on the current user. This module is responsible for prioritizing and filtering the list of available tours by applying the user's history, rules, general population, and available default tours. The tour listing module 332 may take all the criteria about the user to build the optimal tour listing tapered to that user. The criteria may include areas visited, areas successfully mastered, trouble areas, areas backed-out, as well as areas not visited. The criteria may include information from the crossover analysis module 316 about how the general population is using the product and general population behaviors. In addition, tours previously visited and completed may be considered in the final list.

Furthermore, the tour listing module 332 provides an override option allowing the user to see any tour in the system in the event they want to re-take a tour that they have already mastered. This is to handle situations where a user masters a tour and the tour is no longer listed by default.

The tour presentation module 334 is responsible for presentation of the tour to the user in the target system. This module performs on-the-fly updates of tour content and target elements in each tour step while maintaining the state of the tour after user interactions. The tour presentation module 334 considers the tour execution state and detection of invalid tour execution conditions such as valid screen resolution or an exhibit that has been shut down.

The user interface module 10 is responsible for showing tour content from the tour presentation module 334. The user interface module 10 is commonly a web-based interface shown on a computer display, tablet, phone, TV monitor, interactive exhibit display, or proprietary hardware device. The user interface module 10 may also be a stationary monitor at an exhibit in combination with a smart ID device, which identifies the user/GPS location and may call up the appropriate tour content based on user and current tour status/context. The tour content may be displayed based on the unique properties of the user and their current context in the target system. Furthermore, the tour system may display to the user a plurality of tour components, a selected series of tour components, a modified series of tour components, and any other data of the present disclosure.

Figure 4:
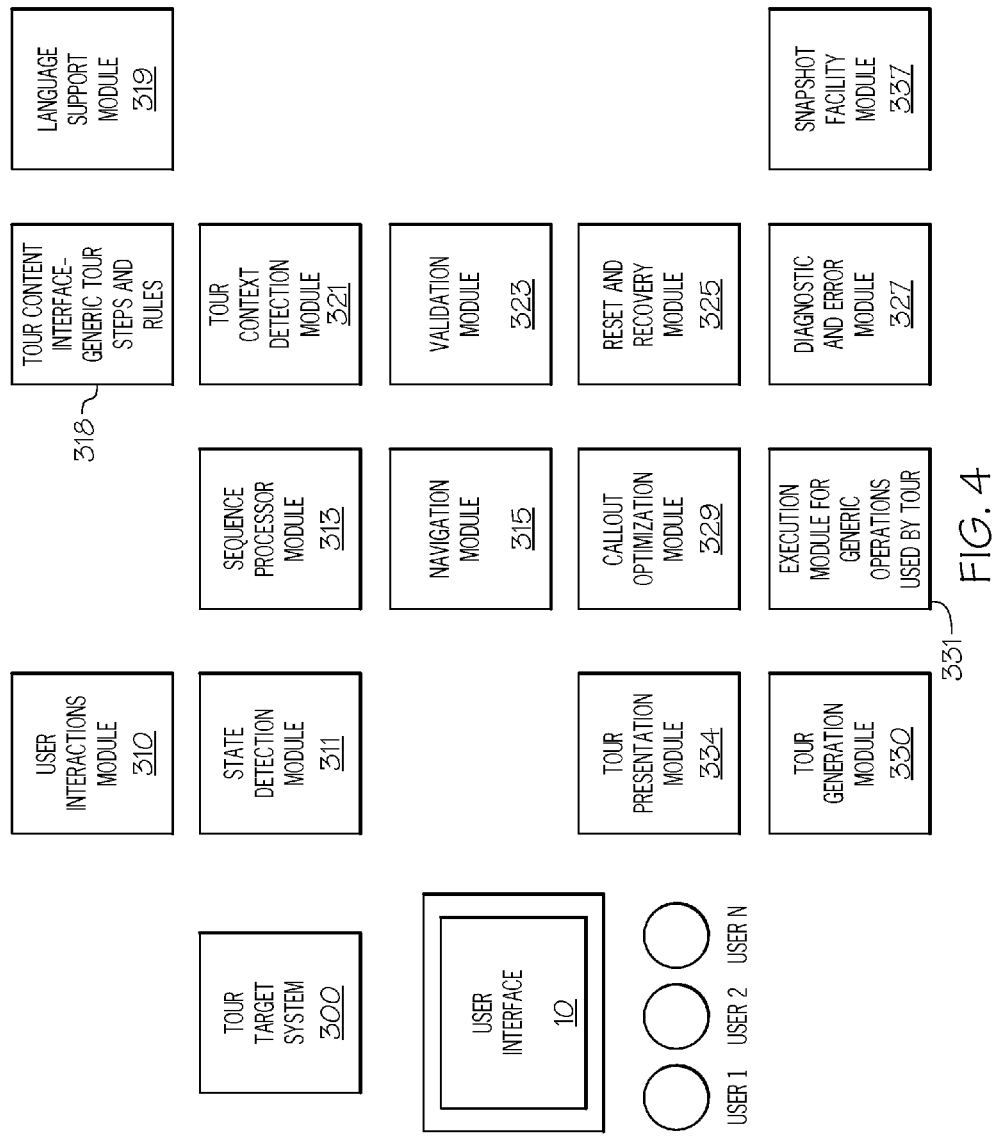
FIG. 4 illustrates another tour generation infrastructure in accordance with a non-limiting embodiment of the present disclosure.

FIG. 4 illustrates another tour generation infrastructure in accordance with a non-limiting embodiment of the present disclosure. The tour system depicted in FIG. 4 provides a framework for navigating and presenting tour content in dynamic interfaces that are not static. Furthermore, the tour generation infrastructure in FIG. 4 adapts to the user's choices during interaction with the tour components. In other words, the recommended tour components adapt during the tour according to the interaction with the user. The tour system also considers, inter alia, interaction information and general population history during the adaptation process. The framework provides a process for dealing with time-driven events that occur after an unknown duration of time. The system performs on-the-fly updates of tour content and target elements in each tour step while maintaining the state of the tour after user interactions. In addition, the framework optimizes the display of tour callout positions and sizes as well as detecting invalid tour execution conditions.

The tour system in FIG. 4 provides ability to perform on-the-fly updates of the target elements in each step, in real time, to adjust and adapt to the underlying UI changes performed by the user. The system also provides a mechanism for UI state detection and checks for availability of UI components, if they have been rendered or not, and corresponding controls to handle tour processing. A construct is provided for making logical branches in the tour based on the user's context.

FIG. 4 depicts a non-limiting embodiment of the present disclosure that automatically optimizes the display of step callouts based on the current state of the UI. In addition, the present disclosure provides a construct for navigating to the target element in the UI. The present disclosure may detect invalid tour execution that will automatically terminate and notify the user of this condition. References to the UI may be a web application or an exhibit such as a museum, zoo, or stadium. Many of the modules of FIG. 4 overlap with modules shown in FIG. 3. These modules may retain the aforementioned properties in the present disclosure.

The tour system in FIG. 4 includes adaptive event time-driven processing, navigation and state detection wherein the system waits for a tour step sequence to complete that includes rendering of the UI, user input, a target UI state, tour sequence processing, a system for UI detection, and a system for displaying callout after the UI has completed rendering.

For tour sequence processing, the tour will update the sequence of steps based on current context or operations available by the user. The tour system provides a construct for taking logical branches in the tour based on context. The tour system also allows rendering operations to be conditional based on context. This allows for more efficient processing and rendering only when needed. Furthermore, the tour system will add or remove steps as needed in the particular user context or particular tour sequence. The tour system may take a generic template of tour steps and update the sequence to reflect the target context. For example, the generic sequence may cover all possible tour steps, the context may have a subset of steps, and the tour system may update the generic template removing the steps not applicable to the context. The tour system will keep the tour interactive while the application state is valid. Finally, the tour sequence process may have the ability to reset and put tour back in context based on unexpected user interactions.

A system for UI detection will check for availability of UI components, if a component exists, and if the component has been rendered and available/visible to the user. The system may automatically initiate a retest at some future time if the system detects the UI in a pre-render or in-render state. The tour state is determined by multiple variables and the state of system. The tour proceeds only after conditions are all met.

The tour system also includes a system for displaying callout (independent popup informational panel) after the UI has completed rendering. This system will wait until the target element is fully rendered before showing the callout for a tour step. Furthermore, this system will issue an additional delay as needed until the target UI context is fully rendered.

The tour system provides a mechanism for defining rules for tour processing and a facility that will detect invalid tour execution states, automatically terminate, and notify the user of this condition. The tour system may detect conditional determination of availability of UI components. Furthermore, the tour system may consider conditional determination of tour availability, as this occurs at every stage of the tour processing, at startup, and during each step. The tour system may detect an invalid state preventing a depiction of tour content and terminate the tour as needed. An invalid state may include, for example, a user updating the display to a size incompatible with the tour system or an exhibit is currently shutdown.

The tour system further comprises a navigation system that updates the UI to make the target elements used by a tour step visible. The navigation system generates detailed instructions for users to navigate through the tour. For example, in a guided tour with an automatic/unattended vehicle, the GPS coordinates may be provided to the vehicle to guide it to the appropriate exhibit for the tour step. The navigation system also dynamically builds web page URLs based on user credentials to view and access user specific screens. The navigation system also updates the UI by loading web page URLs, dialog boxes, simulating button clicks, and scrolling to portions of the screen or the exhibit to make target UI components visible. Finally, the navigation system preserves last use state in a database for subsequent tour invocations so the tour can resume where the user stopped.

The tour system further optimizes display of tour callouts based on various metrics including, display size, location of target UI component, content for tour text, size of callout based on display size, and determination of any offset needed to correctly show the callout.

The tour system provides a set of generic interfaces that respond to tour step processing that expect backend logic to be called for specific conditions. Such generic interfaces include on start tour, on end tour, first time or subsequent use, component visible, can component be shown, get component position, get application state, get display dimensions, navigate to component, and on screen resize.

The tour system further includes a diagnostic and error reporting facility. This facility may report errors while running the tour on the fly. Furthermore, this facility may automatically turn on debugging once an error condition is met. This facility can reset the tour state on the fly programmatically to diagnose problems that would have occurred in initial state conditions. Finally, this facility may include locale handling for support of multiple languages.

The state detection module 311 is responsible for checking the availability of target system elements and any dependent UI components required to navigate and show tour step callout information. This module is also responsible for monitoring any state or status of a target system element and checking if the component exists and has been rendered or not. The state detection module 311 waits for tour step sequences to complete such as rendering of the UI, user input, and target system UI state. This module is used by other modules such as the sequence processor module 313 when checking whether or not to move onto the next sequence in a tour.

The state detection module 311 checks for availability of UI components, if the component exists, and if the component has been rendered. The tour system will automatically initiate a retest at some future time if the system detects the UI in a pre-render or in-render state. For example, if a museum exhibit is closed or under construction, this module would identify the dependent target element component (in this case the exhibit) as being closed. This would be recorded in the system as input to the tour context detection module 321 and the corresponding tour step would be temporarily by-passed or removed from the tour.

As another example, if a software product contains administrator features unavailable for all users, this module may identify which administration features are unavailable. This would be recorded and the administration related tour steps would be eliminated only for non-administrator users.

The sequence processor module 313 is responsible for updating the sequence of steps based on the current user context or operations available by the user. This module is executed at each step in the tour and is responsible for transitioning between each tour step. This module will load the current tour step data/media (text, video, or sound, etc.) and prepare it prior to being displayed in the tour presentation module 334. The sequence processor module 313 will validate that the media for the current step is valid and available for presentation. If the media is not valid, this module will eliminate the tour step or provide some alternative generic content specified by the subject matter expert. The subject matter expert can configure the system to show an error to the end user if the generic content is not applicable.

The tour context detection module 321 is responsible for detecting where the user is in the target system and making changes to the tour conditionally based on the user's context.

This module is used by the navigation module 315 when determining if additional navigation operations must be executed. The tour context detection module 321 provides a construct for taking logical branches in the tour based on context. Consequently, rendering operations are conditional based on context that allow for more efficient processing and rendering only when needed. The context detection is accomplished by calling a set of generic interfaces that provide information about the target system. The tour context detection module 321 provides a set of generic interfaces that respond to tour step processing that expect back-end logic to be called for specific conditions. Such generic interfaces include on start tour, on end tour, first time or subsequent use, component visible, can component be shown, get component position, get application state, get display dimensions, navigate to component, and on screen resize. These interfaces are executed at runtime by the execution module for generic operations used by tour module 331 which is described in a later section.

In a non-limiting embodiment of the present disclosure, the tour content interface generic tour steps and rules module 318 mentioned earlier contains the fundamental structure used to define tour content and rules associated with the content. In addition, module 318 provides a generic template of tour steps and updates the sequence to reflect the user behaviors, rules and target context during live execution of the tour. The tour state is determined by multiple variables and the state of system at run-time. The tour proceeds only after conditions are all met. The system will add or remove steps as needed in the particular user context or particular tour sequence. The system takes a generic template of tour steps from module 318 and updates the sequence to reflect the target context.

For example, the subject matter expert may specify a generic sequence of tour steps in module 318 covering all possible target elements in a particular tour. Then, at run-time, the user taking the tour is in a context that now has a subset of steps (such as a non-administrator user); the system will update the generic template removing the steps not applicable to the user's context.

The language support module 319 provides an interface for the user to specify a target language for the tour content. This module will provide a list of supported languages defined by the subject matter expert and allow the end user to pick the language of choice prior to a tour starting. The media (text, video, audio, etc.) for the selected language will then be used for the tour content. This feature is not enabled if multiple languages are not supported.

The validation module 323 provides a facility that will detect invalid tour execution states that will automatically terminate and notify the user of this condition. At runtime, this module uses the output of the state detection module 311 to get the status of the current tour, tour step and target system elements. The validation module 323 will evaluate predefined criteria that will be used before generating a tour step. If any of the criteria fail and the reset and recovery module 325 indicates the tour was not recoverable, the tour is terminated. The validation module 323 will then show feedback to the end user indicating the tour has terminated and corresponding reason. Terminating the tour may involve several criteria tests, such as conditional determination of availability of UI components and conditional determination of tour availability, which occurs at every stage of the tour processing, at startup, and during each step. The validation module 323 will detect an invalid state such as the user updating the UI display to a small size or exiting the museum such that it is impossible to show tour content.

The reset and recovery module 325 is responsible for keeping the tour running and recovering from error states. This module is responsible for resetting and putting the tour back in context based on unexpected user interactions. The reset and recovery module 325 will keep the tour on-line/interactive while the application state is valid. This module works in conjunction with the validation module 323 and will return an invalid state condition whenever the target system cannot be reset.

During the recovery and reset process, several steps are performed. First, the target system is interrogated to see if it's in a state that allows the tour to run. Next, if the tour cannot run, a reset of the target system is attempted. If the tour still cannot run after the reset, the validation module 323 is notified that the reset or recovery is not possible and the tour will end without proceeding to the next tour step. The validation module 323 will indicate feedback to the user.

If the tour is able to proceed after the reset of the target system, the reset and recovery module 325 will determine the next appropriate tour step to proceed. This module will reset the execution of the tour and resume with the next applicable tour step. The reset and recovery module 325 may notify the validation module 323 that a successful reset occurred. Finally, the tour and target system may resume execution and continue to respond to user interactions.

The diagnostic and error module 327 is responsible for reporting errors and providing diagnostic information to the subject matter expert on state of the tour system and to assist with trouble shooting the system. The diagnostic and error module 327 is used only by the subject matter experts when issues arise from tour execution and is not visible or used by the end user. This module provides a logging facility that records all informational messages that can be reviewed by the subject matter expert. The diagnostic and error module 327 will automatically turn on diagnostics once an error condition is met.

The diagnostic and error module 327 reports information to the subject matter expert, including real-time activity as rules fire and behavior thresholds are achieved when users are interacting with the system. This module also reports any issues with the retrieval of content for the external documentation and tour content module 320. Finally, the diagnostic and error module 327 reports any module specific diagnostic information specific to the particular modules.

Several modes may be enabled at a given time to provide the appropriate level of diagnostic information reported to the subject matter expert. These modes may include user, testing, reset, and simulation modes. In user mode, the subject matter expert can specify a user or set of users that are only reported in the diagnostics. This mode allows the subject matter expert to focus on interactions and behaviors specific to a user or set of users. This mode is useful when trying to isolate issues that may only pertain to a specific user or group of users.

A testing mode allows the subject matter expert to put the system into a state where history is not permanently preserved when users interact with the system. This mode permits running various user scenarios that will not affect the history of the current users in the system.

A reset mode allows the subject matter expert to reset the tour state for a particular user back to an earlier point in time or back to initial conditions as if the user never used the system. This mode may be used to diagnose problems that would have occurred in initial state conditions and with problem areas found in the tour after the user has begun to interact with the target system.

A simulation mode allows the subject matter expert to run a series of user interactions across various users to see the resulting tour generation outcomes and updates to the tours. The user interaction operations could be executed as part of an automatic execution system that inputs user interactions for one or more users. This mode may be used for observing tour generation and rule/behavior outcomes from different users. This mode may also be used by test engineers when verifying new tour content entered into the system and is working as expected. When the mode is turned off, the system is reset back to the state before the simulation mode was started.

A snapshot facility module 337 provides the ability to take snapshot of the complete state of the system at a given point in time. A snapshot contains a backup of all information in the system necessary to reset the system back to the state at the time the snapshot was taken. Snapshots may be taken manually at any time or automatically on a scheduled basis. The subject matter expert could later reset the system to a particular snapshot. Subject matter experts can use this facility when significant changes may regress or disrupt the system and the ability to back out changes is critical.

The navigation module 315 is responsible for making updates to the user interface to show the target element related to a tour step or steps. This module will update the target system based on the target element associated with a target step. This will place the user into the appropriate context prior to showing the tour step content. For example, in a software application, this may require showing a particular form or input panel to the end user. In a museum tour, for example, this may require guiding the user to a specific exhibit or pointing out a particular part of an exhibit.

The navigation module 315 may perform various operations to orient the user. Operations may include showing or making visible target elements used by a particular tour step. This module may generate detailed instructions for users to navigate through the tour. For example, in a guided tour with an automatic/unattended vehicle, the GPS coordinates are provided to the vehicle to guide it to the appropriate exhibit for the tour step. This module may dynamically build web page URLs based on user credentials to view and access user specific screens. The navigation module 315 may update the UI by loading web page URLs, dialog boxes, simulating button clicks and scrolling to portions of the screen or the exhibit to make target UI components visible. This module preserves last use state in a database for subsequent tour invocations so the tour can resume where the user last stopped.

The callout optimization module 329 is responsible for showing tour content in the best fashion possible given the location of the target element associated with the tour step. This module is responsible for optimizing display of tour callout information based on various metrics to provide the best user-experience when viewing the tour content. For example, in a software application, this may require showing a call out informational popup or window by an input control for input data. The callout optimization module 329 may display the call out above or below the input control based on where the control resides with consideration of how much available space to better suit the user. In a museum tour, for example, this may require showing some additional steps to the user to direct the user to a particular part of the exhibit or playing additional media to help the user view the tour content.

The callout optimization module 329 optimizes display of tour callouts based on various metrics, including display or exhibit size, location of target element associated with the tour step, media type to ensure it is visible, size of callout based on display size, determination of any offset needed to correctly show the callout. In other words, this module ensures the tour content is visible at all times.

The execution module for generic operations used by tour module 331 (also referred to as execution module) provides the runtime execution of the generic interfaces that interact with the target system. This module executes the generic interfaces that interact with the target system at each step of the tour process. The execution module 331 will invoke the appropriate interface depending on what part of the tour is being executed. This module may execute the generic interfaces that are responsible for interacting with the target system environment by invoking backend logic (or process) implemented in the target system for specific tour execution conditions. See the tour context detection module 321 section above for the interfaces.

For example, when the tour first begins, the "on start tour" interface is invoked. The execution module 331 would call out to the target system and start the tour. In a software application, this may include showing some initial message that the tour has started and showing a panel to start the tour. In a museum tour, for example, this may include showing the welcome message and navigating to the first exhibit and starting a video.

The tour presentation module 334 is responsible for displaying the tour content for a tour step. This module is responsible for displaying a callout (independent popup, informational panel, video clip, or sound, etc.) after the user interface has completed rendering or user context has been established in the target system. The module may wait until the target element is fully rendered (or user enters the exhibit) before showing the callout for a tour step. The tour presentation module 334 may issue an addition delay as need until the target user interface context is fully rendered. This module may use the navigation module 315 and the callout optimization module 329 to best show the callout.

For example, in a software application, if a tour step callout is to be displayed by an input field on a particular form, this module is responsible for showing the tour step information on the screen. If the input field is not shown, the module will wait until the target element is fully rendered (input field is shown and loaded with the appropriate field data) and the screen is displayed before showing the tour step informational message. In a museum tour, a tour step may require showing a short video clip on a monitor, if the monitor is showing some other video clip (showing video from another user in the system) this module may wait until the video is completed before showing appropriate video for the current user and tour step.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the present disclosure. Other embodiments will be apparent to those of ordinary skill in the art from a consideration of the specification or practice of the present disclosure disclosed herein. It will also be understood by those of ordinary skill in the art that the scope of the disclosure is not limited to use in an interactive tour system, but rather that embodiments of the present disclosure may be used in any transaction having a need to communicate information of any type. The specification and the described examples are considered as exemplary only, with the true scope and spirit of the present disclosure indicated by the following claims.

What is claimed is:

1. A method, comprising:
    selecting a series of tour components for a user from a plurality of tour components, each tour component containing respective interactive user content, based on interaction information of a plurality of past participants with the plurality of tour components, and based on the user's expertise with subject matter of the respective interactive user content of each of the plurality of tour components;
    displaying, via a web-based interface, the series of tour components in an interactive list;
    receiving, from the user via the web-based interface, a selected tour component from the plurality of tour components;
    adapting the series of tour components in real-time based on the selected tour component, by:
        determining the user's prior interaction with the plurality of tour components;
        comparing the user's prior interaction and the selected tour component with the interaction information of the plurality of past participants; and
        modifying the series of tour components based on the comparison;
    detecting the user in an invalid condition during a tour component, wherein the invalid condition prevents the user from moving forward in the series of tour components; and
    debugging the tour component automatically.

2. The method of claim 1, wherein comparing the user's prior interaction and the selected tour component with the interaction information of the plurality of past participants further comprises:
    conducting a probability analysis of the interaction information to anticipate tour component selection by the user.

3. The method of claim 1, wherein the selected tour component is distinct from the series of tour components.

4. The method of claim 1, wherein selecting a series of tour components for a user from a plurality of tour components further comprises determining the user's preferences.

5. The method of claim 1, further comprising:
    displaying to the user the plurality of tour components, the series of tour components, and a modified series of tour components.

6. The method of claim 1, wherein selecting a series of tour components for a user from a plurality of tour components further comprises:
    determining the availability of each tour component of the plurality of tour components.

7. A computer configured to access a storage device, the computer comprising:
    a processor; and
    a non-transitory, computer-readable storage medium storing computer-readable instructions that when executed by the processor cause the computer to perform:
    selecting a series of tour components for a user from a plurality of tour components, each tour component containing respective interactive user content, based on interaction information of a plurality of past participants with the plurality of tour components, and based on the user's expertise with subject matter of the respective interactive user content of each of the plurality of tour components;
    displaying, via a web-based interface, the series of tour components in an interactive list;
    receiving, from the user via the web-based interface, a selected tour component from the plurality of tour components;
    adapting the series of tour components in real-time based on the selected tour component;
    detecting the user in an invalid condition during a tour component, wherein the invalid condition prevents the user from moving forward in the series of tour components; and
    debugging the tour component automatically.

8. The computer of claim 7, wherein comparing the user's prior interaction and the selected tour component with the interaction information of the plurality of past participants further comprises:
    conducting a probability analysis of the interaction information to anticipate tour component selection by the user.

9. The computer of claim 7, wherein the selected tour component is distinct from the series of tour components.

10. The computer of claim 7, wherein selecting a series of tour components for a user from a plurality of tour components further comprises determining the user's preferences.

11. The computer of claim 7, further comprising:
    displaying to the user the plurality of tour components, the series of tour components, and a modified series of tour components.

12. The computer of claim 7, wherein selecting a series of tour components for a user from a plurality of tour components further comprises:

determining the availability of each tour component of the plurality of tour components.

13. A non-transitory computer-readable medium having instructions stored thereon that are executable by a computing system to perform operations comprising:

selecting a series of tour components for a user from a plurality of tour components, each tour component containing respective interactive user content, based on interaction information of a plurality of past participants with the plurality of tour components, and based on the user's expertise with subject matter of the respective interactive user content of each of the plurality of tour components;

displaying, via a web-based interface, the series of tour components in an interactive list;

receiving, from the user via the web-based interface, a selected tour component from the plurality of tour components;

adapting the series of tour components in real-time based on the selected tour component, by:
 determining the user's prior interaction with the plurality of tour components;
 comparing the user's prior interaction and the selected tour component with the interaction information of the plurality of past participants; and
 modifying the series of tour components based on the comparison;

detecting the user in an invalid condition during a tour component, wherein the invalid condition prevents the user from moving forward in the series of tour components; and debugging the tour component automatically.

14. The non-transitory computer-readable medium having instructions stored thereon of claim 13, wherein comparing the user's prior interaction and the selected tour component with the interaction information of the plurality of past participants comprises:

conducting a probability analysis of the interaction information to anticipate tour component selection by the user.

15. The non-transitory computer-readable medium having instructions stored thereon of claim 13, wherein the selected tour component is distinct from the series of tour components.

16. The non-transitory computer-readable medium having instructions stored thereon of claim 13, wherein selecting a series of tour components for a user from a plurality of tour components comprises:

determining the user's preferences.

17. The non-transitory computer-readable medium having instructions stored thereon of claim 13, further comprising:

displaying to the user the plurality of tour components, the series of tour components, and a modified series of tour components.

18. The non-transitory computer-readable medium having instructions stored thereon of claim 13, wherein selecting a series of tour components for a user from a plurality of tour components comprises:

determining the availability of each tour component of the plurality of tour components.

* * * * *